(12) United States Patent
Butz

(10) Patent No.: US 8,739,456 B1
(45) Date of Patent: Jun. 3, 2014

(54) LOW WIND DECOY SYSTEM

(75) Inventor: Scott A. Butz, Fargo, ND (US)

(73) Assignee: Reel Wings Decoy Company, Inc., Fargo, ND (US)

( * ) Notice: Subject to any disclaimer, the term of this patent is extended or adjusted under 35 U.S.C. 154(b) by 406 days.

(21) Appl. No.: 12/688,492

(22) Filed: Jan. 15, 2010

(51) Int. Cl.
*A01M 31/06* (2006.01)

(52) U.S. Cl.
USPC ............................................. 43/2; 43/3

(58) Field of Classification Search
USPC ............................................. 43/1–3
See application file for complete search history.

(56) References Cited

U.S. PATENT DOCUMENTS

| | | | |
|---|---|---|---|
| 72,855 A | 12/1867 | Hughes | |
| 743,301 A | 11/1903 | Lischtiak | |
| 1,629,442 A * | 5/1927 | Geisinger | 43/3 |
| 2,028,849 A * | 1/1936 | Shay | 43/3 |
| 2,129,781 A * | 9/1938 | Park | 43/3 |
| 2,341,028 A | 2/1944 | Fay | |
| 2,441,753 A * | 5/1948 | Carpenter | 43/3 |
| 2,442,417 A | 6/1948 | Lang | |
| 2,762,590 A | 9/1956 | Huie | |
| 2,810,223 A * | 10/1957 | Fraesdorf, Jr. | 40/479 |
| 3,110,460 A * | 11/1963 | Koonce et al. | 244/153 R |
| 3,358,399 A * | 12/1967 | Waldmann | 43/4 |
| 4,012,017 A | 3/1977 | Springston et al. | |
| 4,131,079 A * | 12/1978 | Rousseau et al. | 116/22 A |
| 4,228,977 A | 10/1980 | Tanaka | |
| 4,651,457 A * | 3/1987 | Nelson et al. | 43/3 |
| 4,669,684 A | 6/1987 | Vernelson et al. | |
| 4,779,825 A | 10/1988 | Sams | |
| 4,790,498 A | 12/1988 | Jeffrey | |
| 4,848,704 A | 7/1989 | Sams | |
| 4,850,798 A * | 7/1989 | Bailey | 416/11 |
| 4,911,384 A | 3/1990 | Stankus | |
| 5,003,722 A | 4/1991 | Berkley et al. | |
| 5,524,851 A | 6/1996 | Huang | |
| 5,598,988 A | 2/1997 | Bukur | |
| 6,044,581 A | 4/2000 | Shipman et al. | |
| 6,095,458 A | 8/2000 | Cripe | |
| 6,283,413 B1 | 9/2001 | Bukur | |
| 6,349,902 B1 | 2/2002 | Cripe | |
| 6,357,160 B1 | 3/2002 | Hackman et al. | |
| 6,782,653 B1 * | 8/2004 | Thomas | 43/3 |
| 6,907,688 B2 * | 6/2005 | Brint | 43/2 |
| 7,137,221 B2 * | 11/2006 | Highby et al. | 43/2 |
| 7,458,181 B2 | 12/2008 | Butz | |
| 7,874,093 B2 * | 1/2011 | Rohrke | 43/2 |
| 2007/0199228 A1 * | 8/2007 | Johnson | 43/3 |
| 2008/0163538 A1 * | 7/2008 | Butz | 43/3 |

* cited by examiner

*Primary Examiner* — David Parsley
(74) *Attorney, Agent, or Firm* — Neustel Law Offices

(57) ABSTRACT

A low wind decoy system for efficiently providing realistic motion to decoys in low and high wind environments. The low wind decoy system generally includes a body, comprised of foam or other similar lightweight materials, adapted to be suspended above a ground surface and oriented into the wind. The body is comprised of a substantially thin structure having at least one curvature formed thereon and the peripheral edge of the body has a series of notches extending within to create an irregular movement in response to air flow passing across to attract various different types of animals and birds. The body is generally suspended via a pole assembly and is configured to irregularly move around the pole assembly. The body is also generally colored with a reflective paint substance to match the animal or bird to be attracted.

9 Claims, 10 Drawing Sheets

LOW WIND DECOY SYSTEM

CROSS REFERENCE TO RELATED APPLICATIONS

Not applicable to this application.

STATEMENT REGARDING FEDERALLY SPONSORED RESEARCH OR DEVELOPMENT

Not applicable to this application.

BACKGROUND OF THE INVENTION

1. Field of the Invention

The present invention relates generally to a decoy and more specifically it relates to a low wind decoy system for efficiently providing realistic motion to decoys in low and high wind environments.

2. Description of the Related Art

Any discussion of the related art throughout the specification should in no way be considered as an admission that such related art is widely known or forms part of common general knowledge in the field.

Decoys have been in use for years. Decoys may be used for waterfowl or various other types of migratory birds, or other animals. Decoys may further be stationary or movable during use. Stationary decoys are generally positioned directly upon the ground or supported above the ground with a stake or other fixed object. For a decoy to be movable, various power sources may be utilized.

Generally, since the number of decoys utilized can be numerous, electrical power supplies, such as batteries, are not preferred, wherein the decoy along with the batteries themselves can be very expensive. The decoys are also often times used in wet or rainy environments, thus possibly damaging the electrical components.

Wind powered decoys are generally preferred; however most wind powered decoys that simulate actual flight or substantial movement require high wind speeds to obtain any movement. However, the wind speed is not very often predictable and can be nonexistent at times. Because of the inherent problems with the related art, there is a need for a new and improved low wind decoy system for efficiently providing realistic motion to decoys in low and high wind environments.

BRIEF SUMMARY OF THE INVENTION

A system for efficiently providing realistic motion to decoys in low and high wind environments. The invention generally relates to a decoy which includes a body, comprised of foam or other similar lightweight materials, adapted to be suspended above a ground surface and oriented into the wind. The body is comprised of a substantially thin structure having at least one curvature formed thereon and the peripheral edge of the body has a series of notches extending within to create an irregular movement in response to air flow passing across to attract various different types of animals and birds. The body is generally suspended via a pole assembly and is configured to irregularly move around the pole assembly. The body is also generally colored with a reflective paint substance to match the animal or bird to be attracted.

There has thus been outlined, rather broadly, some of the features of the invention in order that the detailed description thereof may be better understood, and in order that the present contribution to the art may be better appreciated. There are additional features of the invention that will be described hereinafter and that will form the subject matter of the claims appended hereto. In this respect, before explaining at least one embodiment of the invention in detail, it is to be understood that the invention is not limited in its application to the details of construction or to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein.

DETAILED DESCRIPTION OF THE INVENTION

A. Overview

Figure 1:
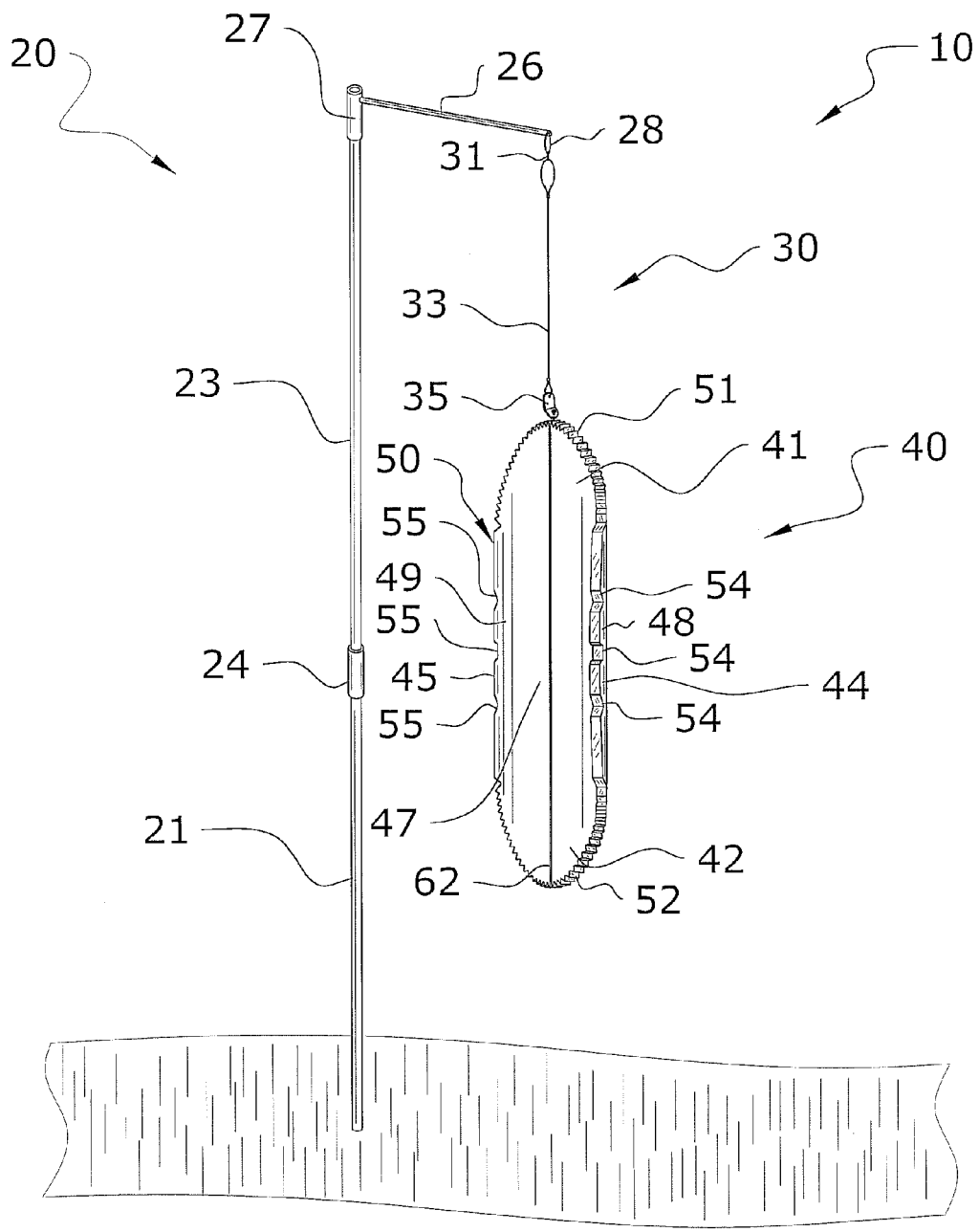
FIG. 1 is an upper perspective view of the present invention.
Figure 2:
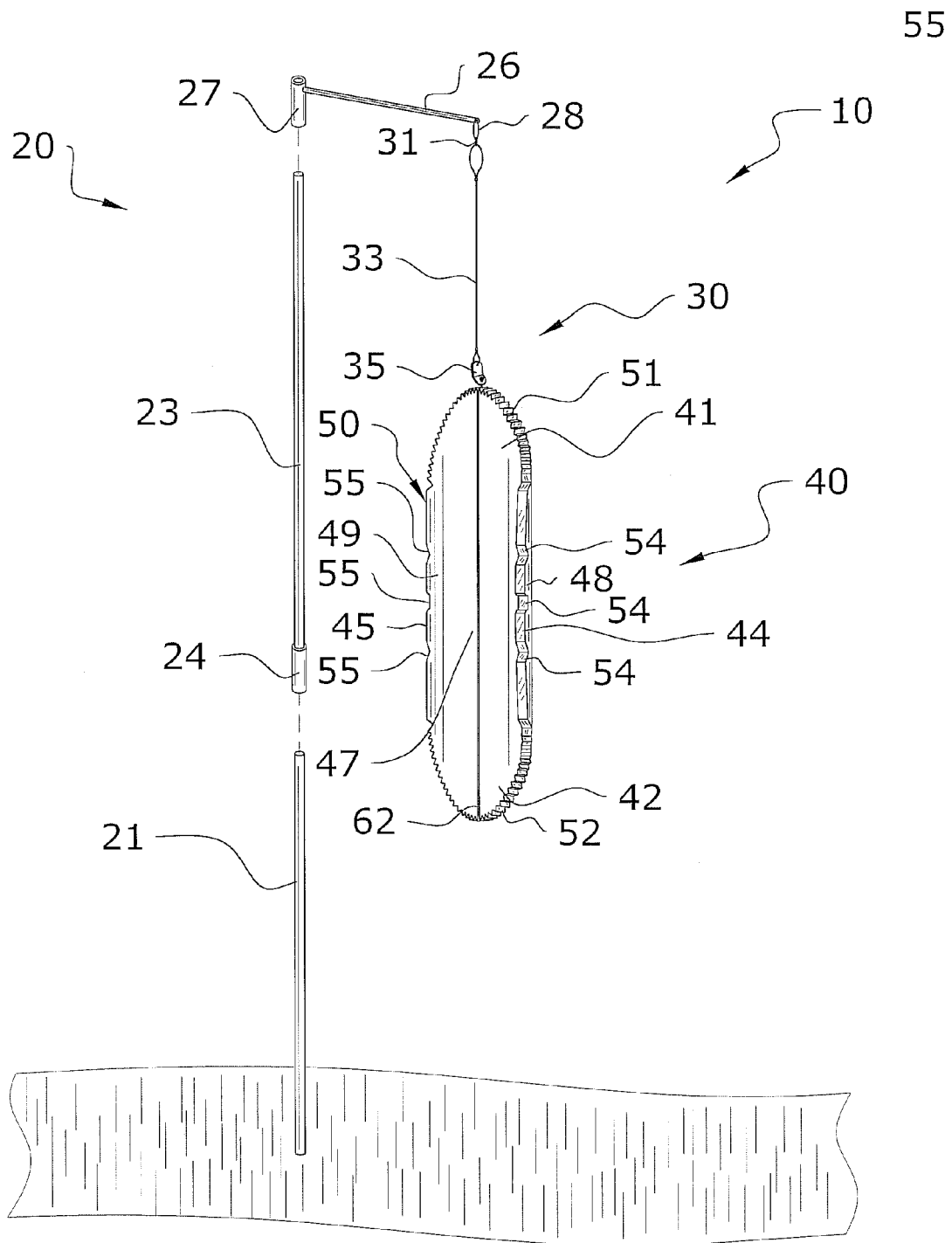
FIG. 2 is an exploded upper perspective view of the present invention.
Figure 3:
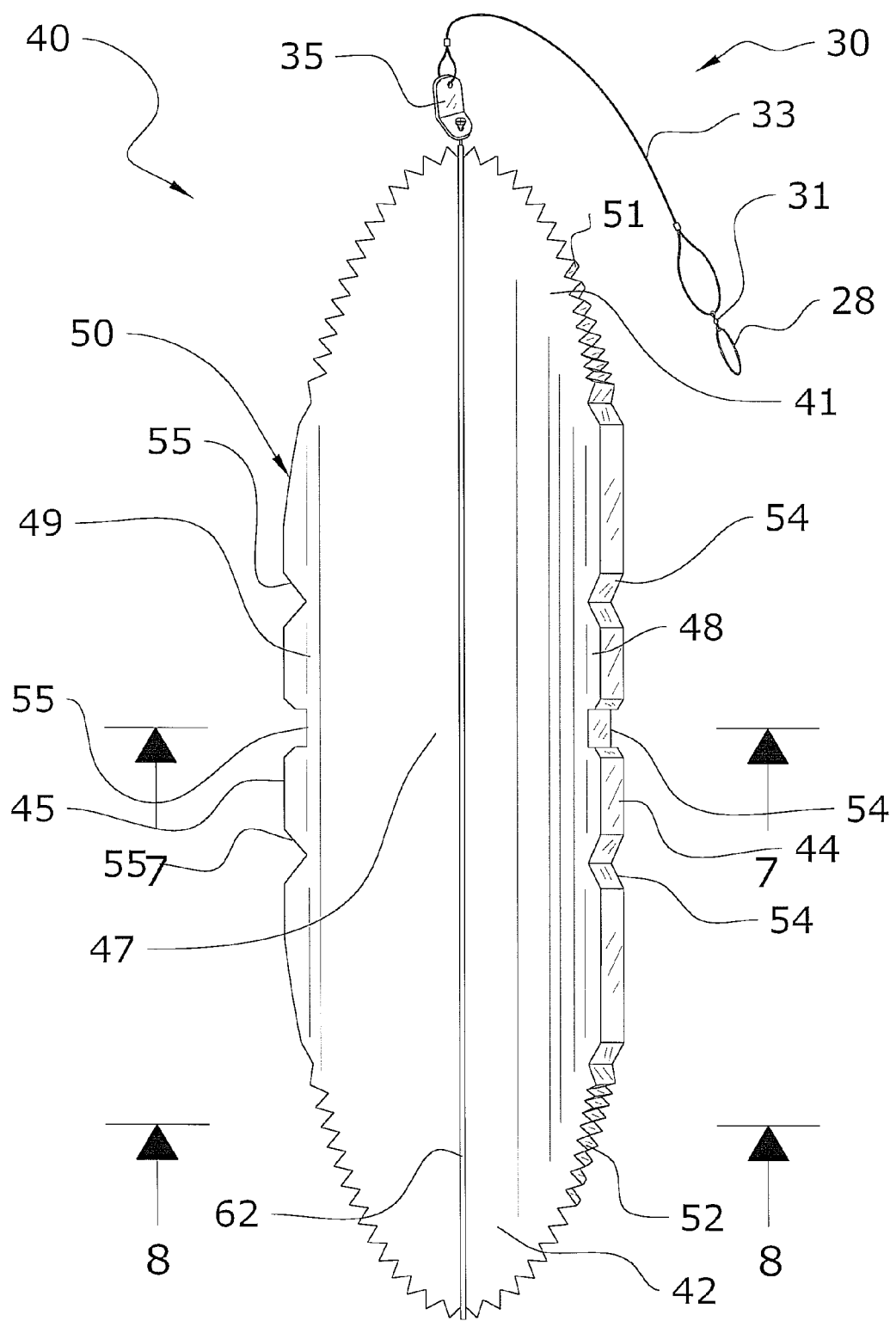
FIG. 3 is a front view of the decoy body.
Figure 4:
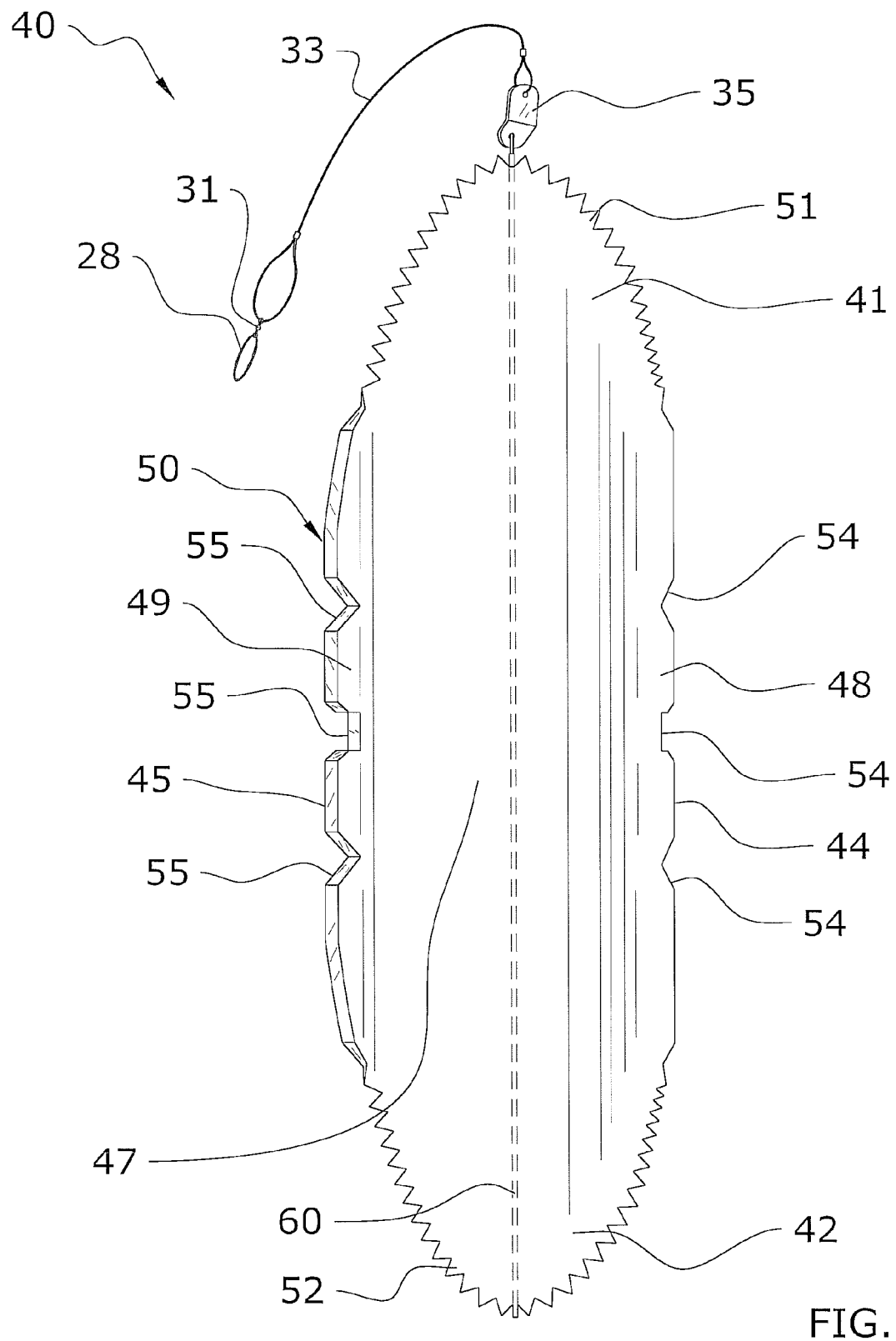
FIG. 4 is a rear view of the decoy body.
Figure 5:
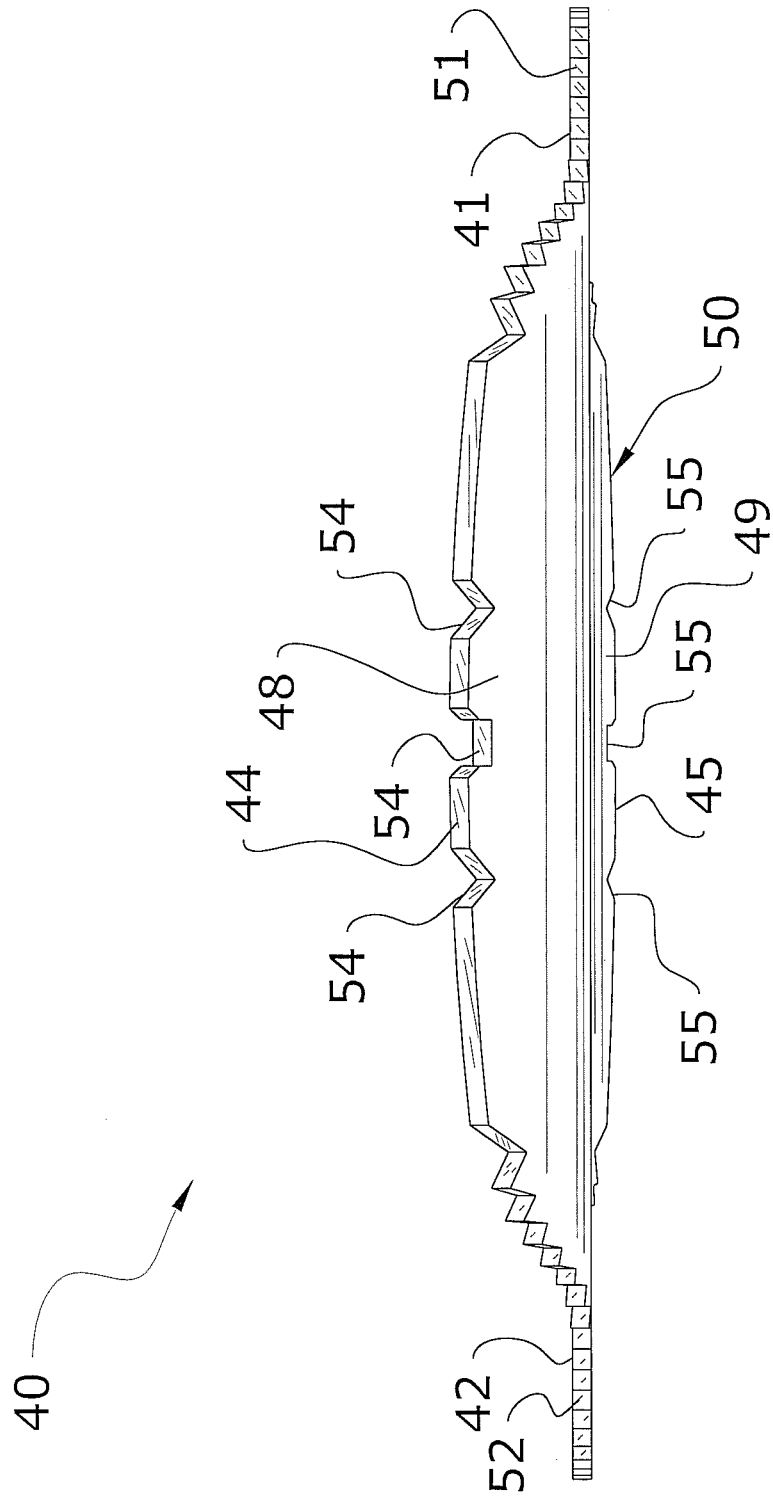
FIG. 5 is a first side view of the decoy body.
Figure 6:
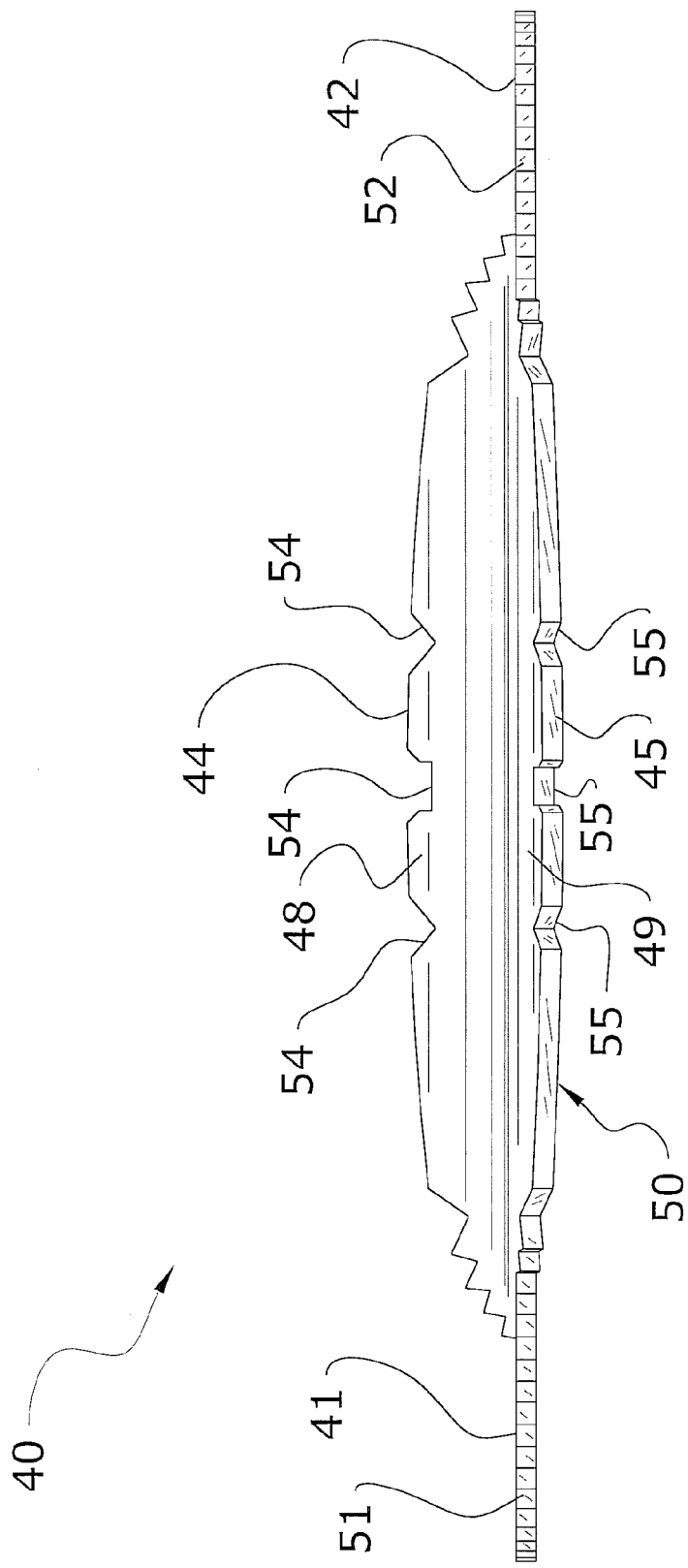
FIG. 6 is a second side view of the decoy body.
Figure 7:
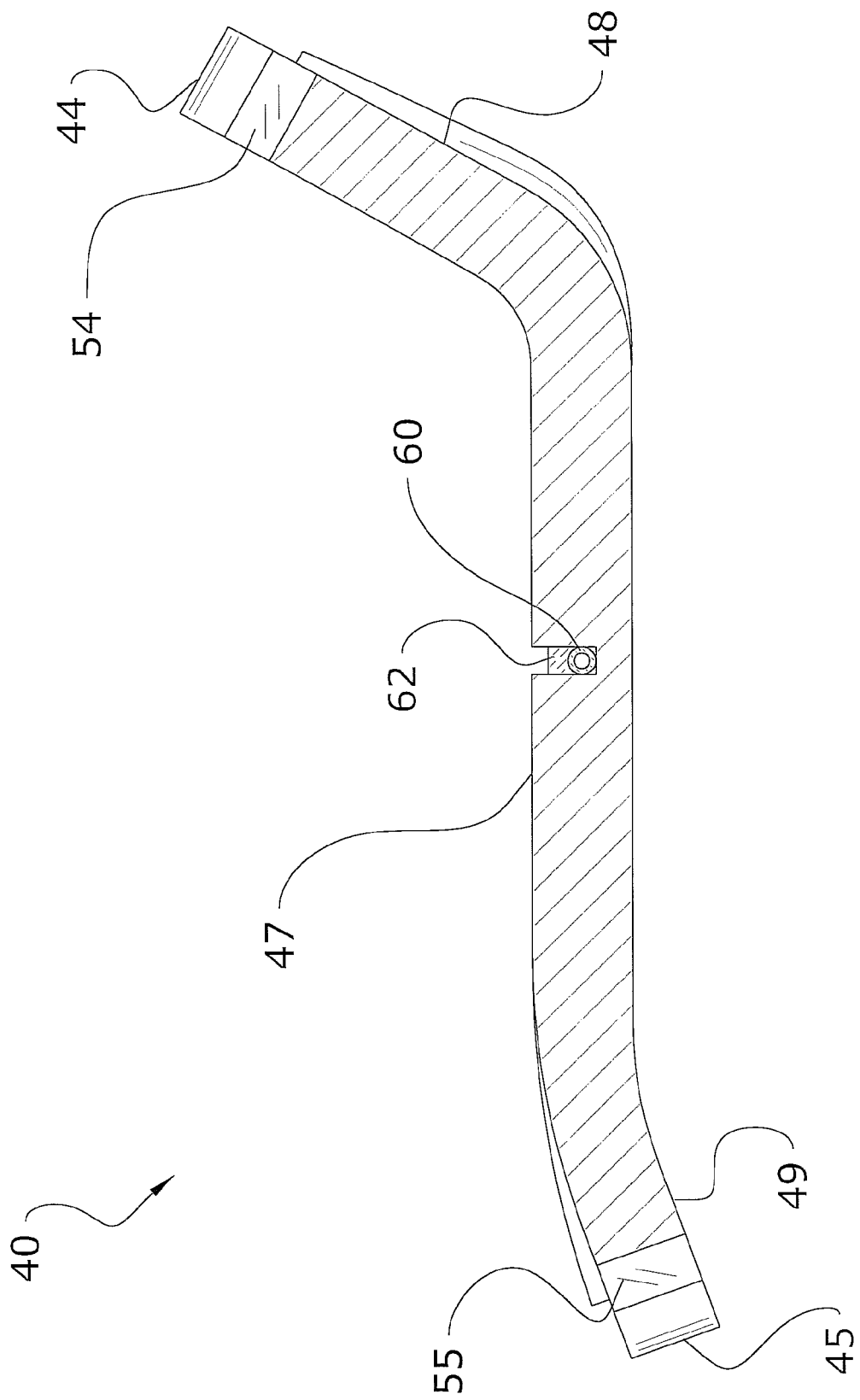
FIG. 7 is a sectional view taken along lines 7-7 of FIG. 3.
Figure 8:
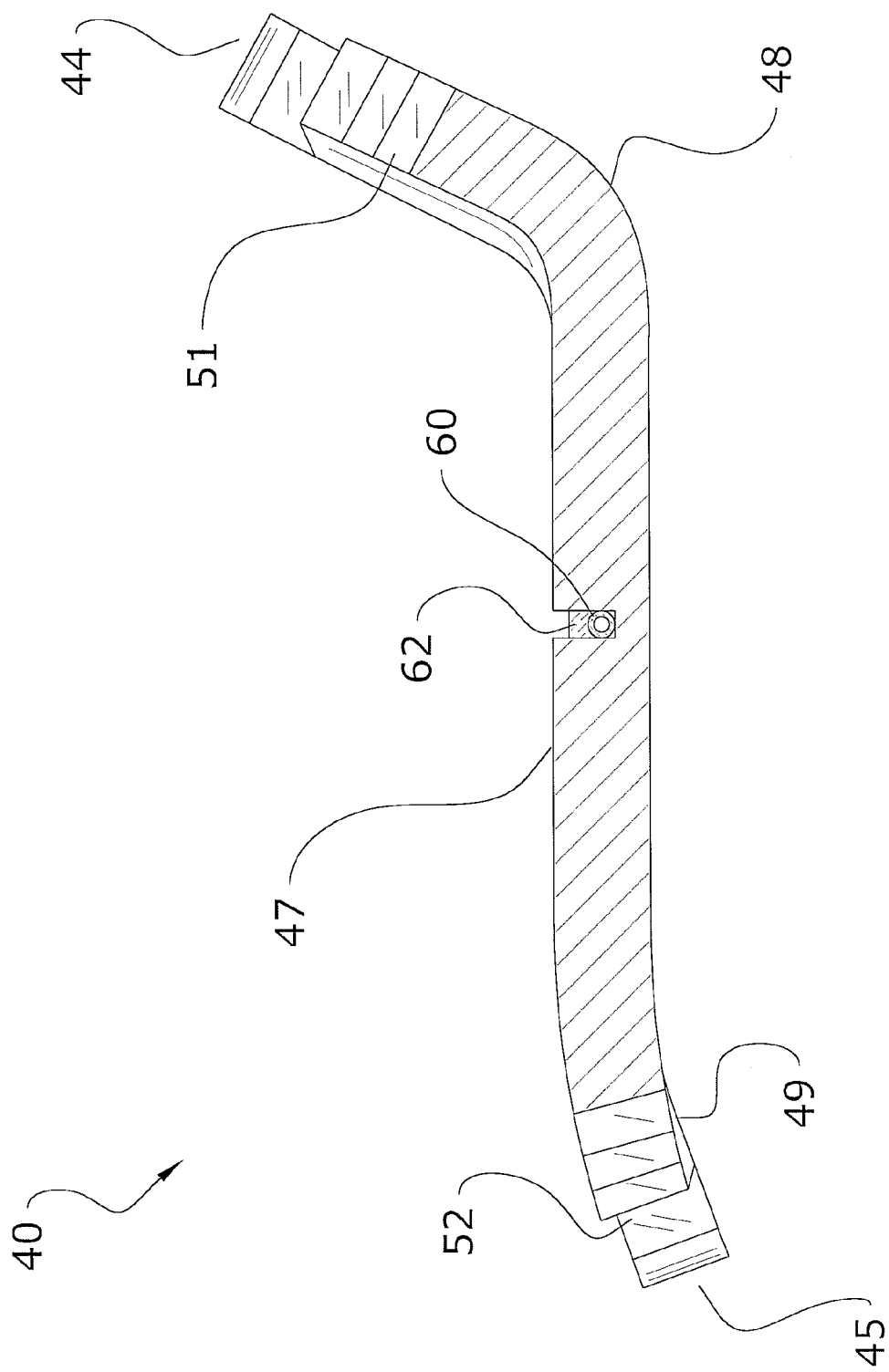
FIG. 8 is a sectional view taken along lines 8-8 of FIG. 3 illustrating the curvatures increasing in a respective radius and lessening in length or outward projection.
Figure 9:
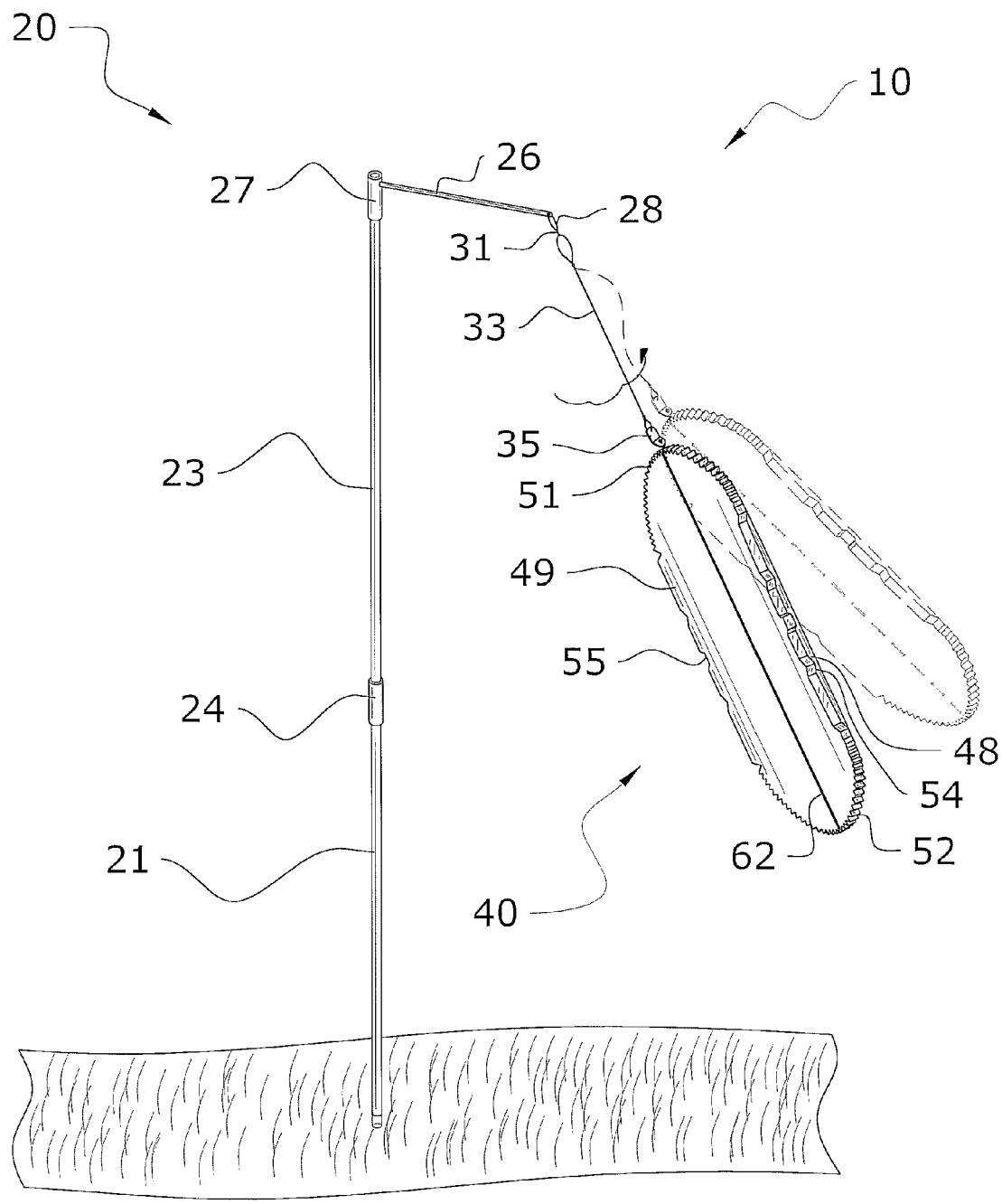
FIG. 9 is an upper perspective view of the present invention in use.
Figure 10:
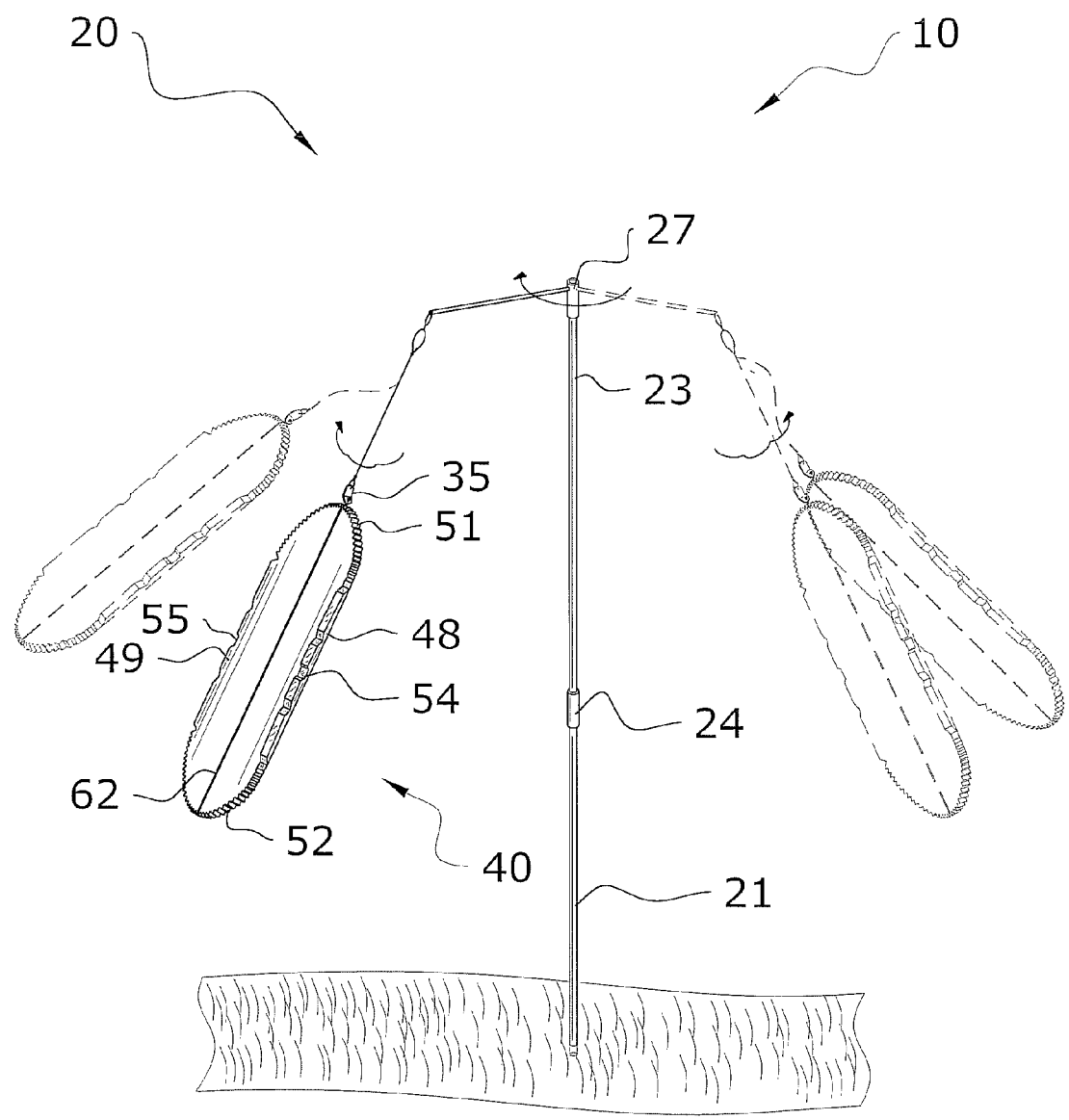
FIG. 10 is another upper perspective view of the present invention in use illustrating the horizontal section of the pole assembly being rotated by the moving decoy body.

Turning now descriptively to the drawings, in which similar reference characters denote similar elements throughout the several views, FIGS. 1 through 10 illustrate a low wind decoy system 10, which comprises a decoy body 40, comprised of foam or other similar lightweight materials, adapted to be suspended above a ground surface and oriented into the wind. The body 40 is comprised of a substantially thin structure having at least one curvature 48, 49 formed thereon and the peripheral edge 50 of the body 40 has a series of notches 51, 52, 54, 55 extending within to create an irregular movement in response to air flow passing across to attract various different types of animals and birds. The body 40 is generally suspended via a pole assembly 20 and is configured to irregularly move around the pole assembly 20. The body 40 is also generally colored with a reflective paint substance to match the animal or bird to be attracted.

B. Pole Assembly

The pole assembly 20 is preferably comprised of a structure that may be disassembled for easy mobility and that may be self-standing to support 60 itself and the movable decoy body 40. The pole assembly 20 may also be adjustable in height. In the preferred embodiment, an end of the pole assembly 20 is inserted within the ground to stabilize the pole assembly 20 in a vertical manner; however it is appreciated that various bases or supports may be utilized that rest upon the ground surface.

The pole assembly 20 generally includes a first vertical section 21 that removably attaches to a second vertical section 23 via a sleeve coupler 24. More vertical sections may be used for greater heights. The lower end of the first vertical section 21 may be tapered or pointed to more easily be inserted within the ground. Attaching to the upper end of the second vertical section 23 is a first coupler 27 which is rotatable upon the second vertical section 23 and also leads to a horizontal section 26, thus making the horizontal section 26 rotatable relative the vertical sections 21, 23. The horizontal section 26 extends outward a sufficient distance from the vertical sections 21, 23 so that the moving decoy body 40 will not engage the vertical sections 21, 23 and the vertical sections 21, 23 will not substantially restrict air flow movement around the decoy body 40.

Extending from the distal end of the horizontal section 26 is preferably a second coupler, eyelet, or attachment point 28 for the connecting assembly 30 to extend vertically downward therefrom. The horizontal section 26 is able to freely rotate 360 degrees relative the vertical sections 21, 23 so that the connected decoy body 40 can rotate around the vertical sections 21, 23 via the freely rotatable horizontal section 26. It is appreciated that more than one horizontal section 26 may be utilized, such as for multiple decoy bodies 40 or to increase the horizontal length of the decoy body 40 away from the vertical sections 21, 23.

C. Connecting Assembly

The connecting assembly 30 is used to suspend the decoy body 40 from the horizontal section 26 of the pole assembly 20 in a free flowing manner to allow the wind current to move the decoy body 40. The connecting assembly 30 generally includes at least one swivel attachment 31, 35 extending from one end of an elongated member 33 and may include multiple swivel attachments, one on each end. The swivel attachments 31, 35 allow for the decoy body 40 to rotate freely with the air flow. The swivel attachments 31, may be connected to an end or side of the peripheral edge 50 of the body 40, as well as various other locations or multiple locations upon the decoy body 40.

The elongated member 33 and the swivel attachments 31, 35 are preferably comprised of lightweight structures prevent hindering the movement of the decoy body 40. The elongated member 33 and the swivel attachments 31, 35 are also preferably comprised of a clear color or color to blend in with a background to not distract from the decoy body 40. Likewise, the pole assembly 20 is colored in a manner to be camouflage or not distract from the decoy body 40.

In the preferred embodiment, the elongated member 33 is comprised of a substantially clear and lightweight line, such as standard fishing line. However, multiple alternate embodiments of the elongated member 33 may be appreciated. Further, the length of the elongated member 33 is such that the decoy body 40 can extend a sufficient distance from the horizontal section 26 to allow for ample movement but less than that which would allow the decoy body 40 to engage the ground surface below and thus less of that of the vertical sections 21, 23.

D. Decoy Body

The decoy body 40 is generally comprised of a lightweight structure that may be moved by low wind currents as well as high wind currents. The decoy body 40 is generally of a shape of the animal, bird, etc. that is desired to be lured in with the decoy body 40. For example, with migratory birds, such as geese, the decoy body 40 resembles the wing span of a goose or wing of a goose.

The decoy body 40 is also generally colored on an exterior surface to resemble a particular bird or animal. The decoy body 40 may be colored with various types of dyes, paints, reflective paints, etc. Various colors include, but are not limited to, grey, white, black, combinations of gray and white, white and black, etc. For example, the tips or ends of the decoy body 40 may be a first color, such as grey or black, and the space between thereof may be another color, such as white. Various color combinations may be used with the present invention all which preferably attract the desired particular bird or animal.

The decoy body 40 generally includes at least one curvature 48, 49 and preferably is comprised of a substantial S-shaped cross-sectional. The decoy body 40 generally includes a longitudinal first curvature 48 curving inwardly from a longitudinal central portion 47 and leading to a first side 44 of the decoy body 40 and a longitudinal second curvature 49 curving outwardly from a longitudinal central portion 47 on an opposing side as the first curvature 48 and leading to a second side 45 of the decoy body 40. The first curvature 48 and the second curvature 49 preferably extend along an entire length of the decoy body 40.

The radius of the first curvature 48 is preferably substantially lesser than the radius of the second curvature 49. The first curvature 48 further preferably curves further inwardly than the second curvature 49 curves outwardly. The first curvature 48 and the second curvature 49 are also not necessarily uniform along the entire length of the decoy body 40, wherein the first curvature 48 and/or the second curvature 49 may slightly spiral or taper inwardly or outwardly towards the first end 41 and/or the second end 42 of the decoy body 40.

The irregular curvatures 48, 49 may resemble the curves of a wing of a bird and are preferably utilized to help the decoy body 40 move in an irregular movement when engaged by the air flow. Irregular movement may be defined as any bouncing or jagged movement. The curvatures 48, 49 also assist the decoy body 40 in rotating while bouncing or moving irregularly due to engagement with the air flow.

The first end 41 and the second end 42 of the decoy body 40 may also curve inwardly, outwardly, upwardly, or downwardly. The first end 41 and/or the second end 42 may also spiral slightly relative the central portion 47 thus making the radius of the first curvature 48 and/or the second curvature 49 slightly lessen or increase towards either the first end 41 or the second end 42. The second swivel attachment 35 is preferably connected to either the first end 41 or the second end 42; however it is appreciated that the second swivel attachment 35 may be connected to the first side 44 or the second side 45.

The peripheral edge 50 of the decoy generally includes a series of notches 51, 52, 54, 55 to assist the decoy body 40 in performing the irregular movement while rotating or moving around the pole assembly 20. The notches 51, 52, 54, 55 catch the air flow at different angles and thus create different angled resistances thus ensuring that the decoy body 40 does not simply spin in a uniform circle and instead twists while bouncing vertically in an irregular manner.

The decoy body 40 further includes a plurality of first end notches 51 and a plurality of second end notches 52. The first end notches 51 are generally similar to the second end notches 52. The first end notches 51 and the second end notches 52 generally line the respective first end 41 and second end 42 around a curved radius (e.g. semi-circular shape) of the first end 41 and the second end 42. The first end notches 51 and the second end notches 52 are further preferably jagged in shape and form a pattern of linear triangles around the curvature of the first end 41 and second end 42.

The decoy body 40 further includes a plurality of first side notches 54 and a plurality of second side notches 55. The first side notches 54 are generally similar to the second side notches 55; however an asymmetrical pattern of first side notches 54 relative the second side notches 55 may be appreciated in alternate embodiments. The first side notches 54 and the second side notches 55 are generally spaced along the respective first side 44 and second side 45 along a straight or bowed edge of the first side 44 and second side 45. The first side notches 54 and the second side notches 55 may be of various shapes, such as triangular, half-moon, square, ovular, etc.

An elongated indentation is generally formed along a center longitudinal axis of the decoy body 40 with respect to a lateral axis. The elongated indentation is for receiving an elongated support 60, which may be comprised of a metal rod or other similar structure. The elongated support 60 extends the length of the body 40 and is positioned within the body 40 to add support 60 and stability to the decoy body 40. The support 60 may be fixedly secured within the indentation via a filler 62, such as an epoxy, etc. It is also appreciated that the support 60 may be formed within the decoy body 40.

E. Operation of Preferred Embodiment

In use, wind currents blowing against the decoy body 40 cause the decoy body 40 to bounce and spin or move irregularly thus creating a more realistic decoy for the incoming birds and/or animals. The irregular movement of the decoy body 40 may also act to disperse the incoming light in irregular manners thus better mimicking a moving animal and/or bird. The decoy body 40 is able to spin, twist relative the elongated member 33 via the second swivel attachment 35. The decoy body 40 is also able to rotate relative the vertical sections 21, 23 of the pole assembly 20 via the horizontal section 26 being rotatable. The lightness of the decoy body 40 along with the lightness of the elongated member 33 allow the decoy body 40 to vertically and horizontally bounce, wobble, spin, and otherwise move irregular with substantially low wind currents or gusts, such as but not limited to 2 mph, thus making the present invention 10 adaptable and effective in various wind situations.

Unless otherwise defined, all technical and scientific terms used herein have the same meaning as commonly understood by one of ordinary skill in the art to which this invention belongs. Although methods and materials similar to or equivalent to those described herein can be used in the practice or testing of the present invention, suitable methods and materials are described above. All publications, patent applications, patents, and other references mentioned herein are incorporated by reference in their entirety to the extent allowed by applicable law and regulations. In case of conflict, the present specification, including definitions, will control. The present invention may be embodied in other specific forms without departing from the spirit or essential attributes thereof, and it is therefore desired that the present embodiment be considered in all respects as illustrative and not restrictive. Any headings utilized within the description are for convenience only and have no legal or limiting effect.

The invention claimed is:

1. A low wind decoy, comprising: a pole assembly comprised of a self-standing structure, wherein said pole assembly includes at least one vertical section, a first coupler rotatably positioned upon said at least one vertical section and at least one horizontal section extending from said first coupler substantially transverse with respect to said at least one vertical section, wherein said at least one horizontal section freely rotates relative said at least one vertical section and wherein said at least one horizontal section is comprised of a rigid pole structure;
   an elongated member suspended from said at least one horizontal section, wherein said elongated member is comprised of a lightweight line;
   a lightweight decoy body adapted to be suspended from an upper support above a ground surface and oriented into the wind;
   wherein said decoy body is comprised of a substantially thin structure having a first curvature and a second curvature each formed along a longitudinal axis of said decoy body, wherein said decoy body has a first end and a second end opposite of said first end along said longitudinal axis, and wherein said first end is attached to said elongated member opposite of said at least one horizontal section;
   wherein a peripheral edge of said decoy body has a series of notches;
   wherein said first curvature curves inwardly relative a lengthwise central portion of said decoy body and wherein said second curvature curves outwardly relative said lengthwise central portion;
   wherein said decoy body is comprised of an S-shaped cross-section;
   wherein a radius of each of the curvatures increases towards an end of said decoy body relative a longitudinal center of said decoy body;
   wherein said series of notches are formed within each longitudinal end of said decoy body and are comprised of a plurality of triangular shaped structures;
   wherein at least one lateral side of the decoy body having a second series of notches, the second series of notches having notches of different shapes;
   wherein the decoy body having a longitudinal channel extending partly through the thickness of the decoy body, an elongated support positioned in the longitudinal channel of the decoy body and extending the longitudinal length of the decoy body, and a filler positioned in the longitudinal channel to fixedly secure the elongated support in the longitudinal channel;
   wherein said decoy body moves in an irregular spinning movement in response to air flow passing across said series of notches and said at least one curvature of said decoy body.

2. The low wind decoy of claim 1, wherein said first curvature extends from a first longitudinal side of said decoy body and wherein said second curvature extends from a second longitudinal side of said decoy body.

3. The low wind decoy of claim 2, wherein said first curvature has a lesser radius than said second curvature.

4. The low wind decoy of claim 1, wherein said series of notches are formed within each lateral side of said decoy body.

5. The low wind decoy of claim 1, wherein said at least one vertical section is comprised of a first vertical section that is adapted to penetrate a ground surface, a sleeve coupler attached to an upper end of said first vertical section and a second vertical section attached to said sleeve coupler extending upwardly from said first vertical section.

6. The low wind decoy of claim 5, wherein said first vertical section removably attaches to said second vertical section via said sleeve coupler.

7. A low wind decoy system, comprising: a pole assembly having at least one vertical section and at least one horizontal section extending therefrom, wherein said at least one horizontal section freely rotates relative said at least one vertical section and wherein said at least one horizontal section is comprised of a rigid pole structure;
   an elongated member suspended from said at least one horizontal section; and a lightweight decoy body suspended from said elongated member above a ground surface and oriented into the wind, wherein a first end of said decoy body is connected to said elongated member;
   wherein said decoy body freely rotates relative said at least one horizontal section; wherein said decoy body is comprised of a substantially thin structure; wherein said decoy body has a central portion, a first curvature extending from a first side of said central portion along a longitudinal axis of said decoy body, and a second curvature extending from a second side of said central portion along said longitudinal axis of said decoy body;
   wherein said first curvature curves inwardly relative said central portion of said decoy body and wherein said second curvature curves outwardly relative said central portion;
   wherein a peripheral edge of said decoy body has a series of notches;
   wherein said first curvature curves inwardly relative a lengthwise central portion of said decoy body and wherein said second curvature curves outwardly relative said lengthwise central portion;
   wherein said decoy body is comprised of an S-shaped cross-section;
   wherein a radius of each of the curvatures increases towards an end of said decoy body relative a longitudinal center of said decoy body;
   wherein said series of notches are formed within each longitudinal end of said decoy body and are comprised of a plurality of triangular shaped structures;
   wherein at least one lateral side of the decoy body having a second series of notches, the second series of notches having notches of different shapes;
   wherein the decoy body having a longitudinal channel extending partly through the thickness of the decoy body, an elongated support positioned in the longitudinal channel of the decoy body and extending the longitudinal length of the decoy body, and a filler positioned in the longitudinal channel to fixedly secure the elongated support in the longitudinal channel;
   wherein said decoy body moves in an irregular spinning movement in response to air flow passing across said series of notches and said at least one curvature of said decoy body.

8. The low wind decoy system of claim 7, wherein said first curvature has a lesser radius than said second curvature.

9. A low wind decoy system, comprising:
   a pole assembly having at least one vertical section and at least one horizontal section extending therefrom;
   wherein said at least one horizontal section freely rotates relative said at least one vertical section;
   wherein said at least one horizontal section is comprised of a rigid pole structure; an elongated member suspended from said at least one horizontal section; and
   a lightweight decoy body suspended from said elongated member above a ground surface and oriented into the wind;
   wherein said decoy body has ends curved in a semi-circular shape and has sides connecting said ends;
   wherein said decoy body freely rotates relative said at least one horizontal section;
   wherein said decoy body is comprised of a substantially thin structure; wherein said decoy body has a central portion, a first curvature extending from a first side of said central portion along a longitudinal axis of said decoy body, and a second curvature extending from a second side of said central portion along said longitudinal axis of said decoy body;
   wherein said first curvature curves inwardly relative said central portion of said decoy body and wherein said second curvature curves outwardly relative said central portion;
   wherein said first curvature has a lesser radius than said second curvature;
   wherein a radius of said first curvature and said second curvature increases towards said end of said decoy body relative a longitudinal center of said decoy body;
   wherein said decoy body has a series of notches extending within a peripheral edge of said decoy body;
   wherein said series of notches include a plurality of end notches formed within each said longitudinal end of said decoy body;
   wherein said plurality of end notches are comprised of triangular shapes;
   wherein said series of notches include a plurality of side notches formed within each said lateral side of said decoy body;
   wherein said at least one vertical section is comprised of a first vertical section that is adapted to penetrate a ground surface, a sleeve coupler attached to an upper end of said first vertical section and a second vertical section attached to said sleeve coupler extending upwardly from said first vertical section;
   wherein said first vertical section removably attaches to said second vertical section via said sleeve coupler
   wherein said decoy body is comprised of an S-shaped cross-section;
   wherein said plurality of side notches having notches of different shapes;
   wherein the decoy body having a longitudinal channel extending partly through the thickness of the decoy body, an elongated support positioned in the longitudinal channel of the decoy body and extending the longitudinal length of the decoy body, and a filler positioned in the longitudinal channel to fixedly secure the elongated support in the longitudinal channel;
   wherein said decoy body moves in an irregular spinning movement in response to air flow passing across said series of notches and said at least one curvature of said decoy body.

* * * * *